A. P. WILLS.
ROLLER BEARING.
APPLICATION FILED JULY 14, 1913.
1,222,833.
Patented Apr. 17, 1917.
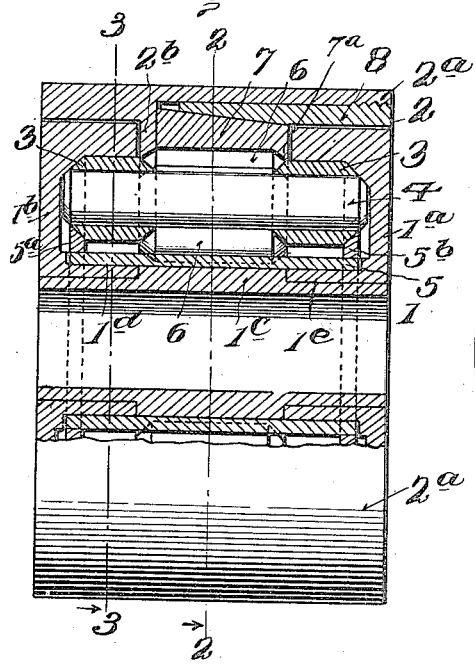
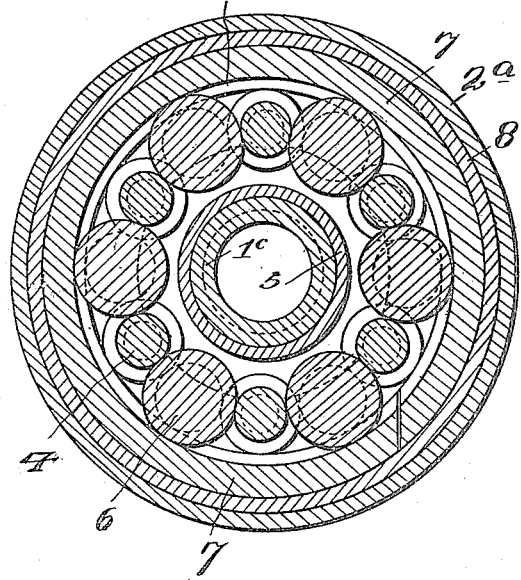
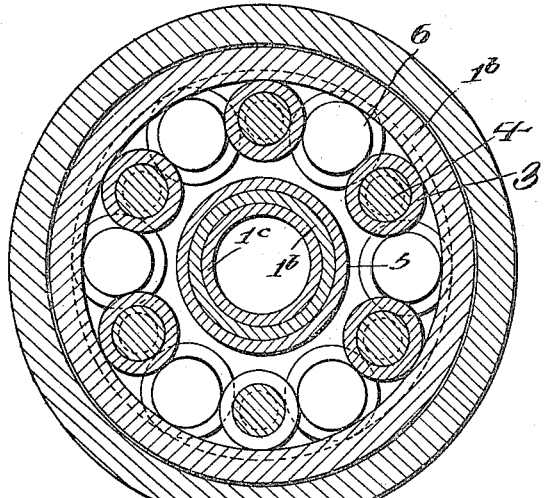
Witnesses
Inventor
Albert P. Wills
By Edmund H. Parry
Attorney

UNITED STATES PATENT OFFICE.

ALBERT P. WILLS, OF NEW YORK, N. Y.

ROLLER-BEARING.

1,222,833.  Specification of Letters Patent.  Patented Apr. 17, 1917.

Application filed July 14, 1913. Serial No. 779,036.

*To all whom it may concern:*

Be it known that I, ALBERT P. WILLS, a citizen of the United States, residing at New York, in the county of New York and State of New York, have invented certain new and useful Improvements in Roller-Bearings, of which the following is a specification, reference being had therein to the accompanying drawing.

This invention relates to roller bearings.

The object of the invention is to provide a roller-bearing in which the parts are so aggrouped and related that the rolling elements are prevented while in motion from crossing each other, as frequently occurs in roller-bearings of present-day construction. In other words, the structure is such that proper alinement of each of the rolling elements in relation to certain encompassing primary and secondary elements is maintained under all conditions of operation.

The object is, also, to provide such a structure that, at the contacting surfaces of the rolling, primary and secondary elements, all of such surfaces are in convex-concave relationship; that is to say, the rolling elements track only upon internal surfaces of annular elements in contradistinction to a contact of convex relationship, as where the rolling elements track upon the exterior, cylindrical surfaces of supporting elements.

In the accompanying drawings I have illustrated a preferred embodiment of my invention, it being understood that the invention is susceptible of a wide range of modification without departing from the spirit thereof.

In these drawings:

Figure 1 is a view in longitudinal section, partly in elevation;

Fig. 2 is a transverse section on the line 2—2, Fig. 1;

Fig. 3 is a similar view on the line 3—3, Fig. 1; and

Fig. 4 is a fragmentary view in perspective of the spacing device or cage of the structure.

Referring to the drawings, the numeral 1 designates, generally, a secondary element which, in this instance, consists of annular end-portions or rings $1^a$ and $1^b$ spaced from each other, an axle-portion $1^c$ encircled by said end-portions, and hub-portions $1^d$ and $1^e$ which surround the ends of the axle-portion $1^c$.

A primary element 2, which includes a housing-portion $2^a$ and a shouldered ring-portion $2^b$, which extends from the portion $2^a$, and surrounds the secondary element.

Tracking on internal surfaces of the annular portions $1^a$ and $1^b$ are hollow load-carrying rolls or sleeves 3 mounted on a series of primary rolls 4 which are arranged in spaced relation to each other. Preferably and as shown, each of the sleeves is tapered at both of its ends and these abut on tapered walls, respectively, of the annular portions $1^a$ and $1^b$. Likewise, the tapered ends rest in correspondingly tapered depressions in disks $5^a$ and $5^b$ fixed to a sleeve 5 which fits on the axle-portion $1^c$ of the secondary element 1. These disks and the sleeve 5 constitute a cage for the rolls 3. To prevent the sleeve from moving longitudinally with respect to the secondary element, the hub-portions $1^d$ and $1^e$ are provided with shoulders against which the ends of said sleeve abut.

In assembling, the hub-portions $1^d$ and $1^e$ are pressed over the axle-portion $1^c$ and up against shoulders formed thereon, these shoulders serving to space, longitudinally, the rings $1^a$ and $1^b$ with respect to each other, since the hub-portion $1^d$ and the annular-portion $1^a$, and, likewise, the hub-portion $1^e$ and the annular portion $1^b$, are rigidly connected.

Intermediate of the set of rolls 4, there is a set of secondary or spacing rolls 6 adapted to press and track on the rolls 4. The rolls 6 have tapered ends which abut on corresponding tapered ends of the sleeves 3.

Encompassing the rolls 6 there is a contractile ring 7, preferably of the familiar split-ring type. At one end of the ring 7 there is a tapered bead $7^a$ abutting on the correspondingly tapered ends of the rolls 6. The periphery of the ring 7 is tapered to fit a correspondingly tapered tightening nut-ring 8 which threads into one end of the housing-portion $2^a$ of the primary element 2. The ring 7 at the end opposite the bead $7^a$ abuts against the internal shouldered ring-portion $2^b$. The shoulder of this ring $2^b$ is tapered, as shown in Fig. 1, so as to abut on correspondingly tapered ends on the rolls 6, similar to the bead $7^a$ on the ring 7.

By turning the nut-ring 8 into the housing-portion $2^a$ of the primary element 2, the ring 7 is made to contract slightly and the rolls 6 are thereby forced inwardly between the rolls 4. Furthermore, the rolls 6 and 4 are so dimensioned that when the rolls 6 are forced radially inward, the rolls 4—and likewise their sleeves 3—are forced radially outward, the sleeves 3 being brought thereby into contact with the rings 1ª and 1ᵇ. In other words, the pressure effected by the ring 7, when contracted by the tightening ring 8, upon the pressing-rolls 6, produces a force which is transmitted to the primary rolls 4 at the points indicated by the broken circular line $x$ in Fig. 2, in consequence of which said rolls 4 are, by the secondary rolls 6, pressed outward, resulting in their sleeves being pressed against the internal tracking surfaces of the rings 1ª and 1ᵇ. It will, therefore, now be obvious that the load is supported by the primary and secondary elements 2 and 1, respectively, coöperating with the rolls; hence, the cage (formed by the sleeve 5 and disks 5ª and 5ᵇ) does not support the load and is, therefore, free to rotate easily.

It will also be seen that the rolls 4 with their sleeves 3 track only on an internal surface of one element and entirely independent of any part or parts about which they travel. In other words, the load-carrying rolls in my structure track only on a single surface and that an internal surface, thereby presenting a contact of parts having a concave-convex relationship, as distinguished from a structure wherein the rolls track upon two surfaces, one an internal surface of an encompassing element, and the other a cylindric external surface of another element.

From the foregoing description, it is clear that the motion of the elements of the device included between the primary and secondary elements is practically one of pure rolling and that, therefore, the device described constitutes a roller-bearing.

It is to be understood that the form of the rolls, rings and other elements of the structure may be considerably varied and be within the spirit of my invention.

What I claim is:

1. A roller-bearing device including a primary element, a secondary element, a plurality of interposed rolling elements, and a plurality of encompassing elements, one of which is deformable whereby when moved in relation to another of the encompassing elements some of the rolling elements are pressed outwardly away from the common axis of said encompassing elements and into contacting relationship with the secondary element in such manner that the contacting surfaces of said rolling and primary elements are in convex-concave relationship.

2. A roller-bearing device including a primary element, a secondary element, a plurality of interposed rolling-elements, and a plurality of encompassing elements, one of which is deformable whereby, when moved in relation to another of the encompassing elements, pressure is exerted on some of the rolling elements which in turn effect a corresponding pressure on other of said rolling elements to press them outwardly with respect to the common axis of the primary and secondary elements.

3. A roller-bearing device including a primary element, a secondary element, a plurality of interposed rolling elements, and a plurality of encompassing elements, movable relatively to exert pressure through the interposed elements upon one of the other elements outwardly with respect to the common axis of the primary and secondary elements.

4. A roller bearing structure including a primary element, a secondary element, track elements, and roller elements, some of which track only internally on some of said track elements and others track only internally on another of said track elements.

5. A roller-bearing structure including a primary element, a secondary element, and rolling elements tracking on internal surfaces of said elements and independent of the other surfaces of said elements.

6. A roller-bearing structure including a primary element, a secondary element, and rolling elements encompassed by said elements and being in tracking contact with internal surfaces only of said elements.

7. A roller bearing including a primary element, a secondary element, each of said elements encompassing the axis of the other, track elements, and roller elements encircled by at least one of said encompassing elements, some of which track only internally on some of said track elements and others track only internally on another of said track elements.

8. A roller bearing comprising a primary element, a secondary element encompassing the axis of said primary element, track elements, and rolling elements encompassed by said primary elements, some of which track only internally on some of said track elements and others track only internally on another of said track elements.

9. A roller bearing structure including a primary element, an encompassing element encircling the axis of said primary element, track elements, and load sustaining rolling elements, some of which track only internally on some of said track elements and others track only internally on another of said track elements.

10. A structure including a primary element having an internal surface, a secondary element encompassing the axis of the primary element and rolling elements tracking only on the internal surface of the primary element.

11. A roller-bearing structure including a primary element, an encompassing element encircling the axis of the same, and load-sustaining rolling elements tracking on an internal surface of both of said elements, and means for contracting said encompassing element to press said rolling elements away from the common axis of said elements.

12. A roller-bearing structure including a secondary element comprising a pair of spaced annular portions and an axle-portion; a primary element comprising a housing-portion and a ring-portion extending therefrom; load-sustaining elements encompassed by one of said elements and some of which track on an internal surface of the secondary instrumentality; a contractile ring encompassing some of said rolling elements, and a tightening device encircling said ring and adjustable to contract the ring and thereby press certain of the rolling elements inward and others thereof outward against the internal tracking surface.

13. A roller bearing structure comprising a secondary element; annular ring members, having internal surfaces thereof forming raceways, associated with said secondary element; a plurality of primary rolling elements disposed within said raceways; a plurality of load carrying members associated with said primary rolling elements and tracking only on internal surfaces of said annular ring members; spacing members disposed between said primary rolling elements; a contractile member surrounding said spacing members; a tightening element associated with said contractile element; and a primary element surrounding the secondary, the contractile, and the tightening elements.

14. A roller bearing structure comprising a secondary element; annular ring members each having an internal surface forming a raceway, and having also a shoulder, associated with said secondary element; primary rolling elements disposed within said ring members; a plurality of load carrying members disposed upon said primary rolling elements; said load carrying members being provided at their extremities with a beveled portion; a plurality of spacing rollers each having at its extremities, a beveled portion co-acting with a beveled portion of the load carrying members, and disposed between said primary rolling elements; a contractile member having a beveled portion adapted to co-act with a beveled portion of the spacing rollers, and surrounding said spacing rollers; a tightening element associated with said contractile element; and a primary element having a shoulder thereon provided with a beveled portion adapted to contact with a beveled portion of the spacing rolls, said primary element surrounding the tightening elements, the contractile element, the ring elements and said secondary elements.

15. A roller bearing structure comprising a secondary element; annular ring members each having an internal surface forming a raceway, and having also a shoulder, associated with said secondary element; primary rolls disposed within said ring members; a plurality of load carrying rollers disposed upon said primary rollers; said load carrying rollers being provided at their extremities with beveled portions; a plurality of spacing rollers each having at its extremities, a beveled portion co-acting with a beveled portion of the load carrying rollers, and disposed between said primary rollers; a contractile member having a beveled portion adapted to co-act with a beveled portion of the spacing rollers, and surrounding said spacing rolls; a tightening element associated with said contractile element; a primary element having a shoulder thereon provided with a beveled portion adapted to contact with a beveled portion of the spacing rolls, said primary element surrounding the tightening element, the contractile element, the ring elements and said secondary element; and a plurality of sleeve members each having a beveled portion adapted to engage a beveled portion of the load carrying rolls, said sleeve members being mounted on an inner portion of the ring members and bearing against the shoulders thereon.

In testimony whereof I affix my signature in presence of two witnesses.

ALBERT P. WILLS.

Witnesses:
EDMUND H. PARRY,
JAMES ATKINS.

Copies of this patent may be obtained for five cents each, by addressing the "Commissioner of Patents, Washington, D. C."